Jan. 30, 1945.  C. B. ASKE, JR  2,368,232
ORNAMENTAL WHEEL TRIM RING
Filed Aug. 18, 1941   2 Sheets-Sheet 1

INVENTOR.
CHARLES B. ASKE, JR.
BY

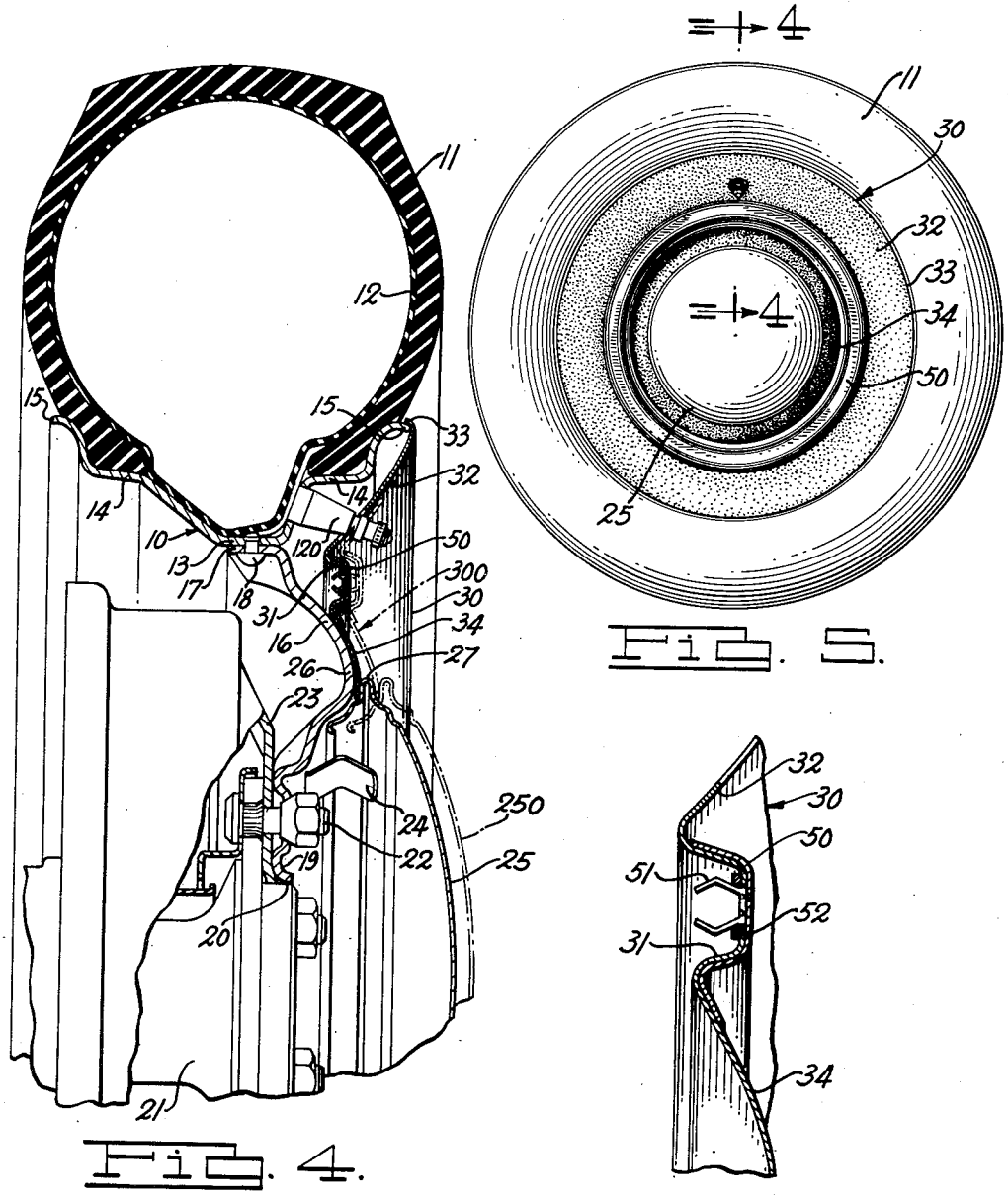

Patented Jan. 30, 1945

2,368,232

UNITED STATES PATENT OFFICE 2,368,232

ORNAMENTAL WHEEL TRIM RING

Charles B. Aske, Jr., Detroit, Mich., assignor to Lyon, Incorporated, Detroit, Mich., a corporation of Delaware Application August 18, 1941, Serial No. 407,313

2 Claims. (Cl. 41—10)

This invention relates to means for producing a pleasing wheel and tire effect for motor vehicle wheels equipped with the usual standard dark gray to black tires.

Heretofore, there has been a consistent public demand for improved visual automotive wheel and tire effects, and, regardless of the many disadvantages, millions of "doughnut" or "balloon" tires have been sold and millions of white side wall tires are in use today.

In the prior art it has been customary to produce a pleasing tire effect and outstanding appearance to motor vehicle wheels by employing tires having contrasting colored side walls, usually white. The contrasting colored side walls are usually built into tires by vulcanizing in the side of the tire a strip of pigmented or otherwise colored rubber.

White side wall tires have many disadvantages among which are that they are subject to cracking and crazing, and become discolored easily, they are difficult and expensive to clean, they scuff easily against curbs and the like, and they are expensive to manufacture because of the high quality of rubber required to prevent premature discoloration from migration of accelerators and the like, because of the great care required to prevent the accidental introduction of discoloring materials, and because slight blemishes and defects spoil their appearance. These things result in high manufacturing costs and a large percentage of culls or seconds.

Furthermore, the public demand consistently has been for deeper or larger appearing tires and smaller appearing wheels to enhance the beauty of motor cars and to give to the motor car the appearance of being low slung, streamlined, and racily and sturdily built. To employ doughnut or balloon tires, special wheels to accommodate the wide bead seat of doughnut or balloon tires were required which was extremely expensive, and, in many instances, wheel changes to accommodate doughnut or balloon tires were impossible because of fender, spindle, spring and brake assembly clearances.

With the foregoing in view, the primary object of the invention is to provide means employable in association with a conventional automobile wheel, hub cap and standard tire for producing white or other contrasting side wall tire effects and improved car appearance.

Another object of the invention is to provide means employable in association with a standard automobile wheel, hub cap and tire for producing small wheel and large tire effect with relatively larger wheels and smaller tires.

Another object of the invention is to provide means employable in association with a standard automobile wheel, hub cap and standard tire for producing a combined doughnut or balloon and white side wall tire effect with relatively larger wheels and smaller tires.

Another object of the invention is to provide means for producing white or other contrasting side wall tire effect with standard tires which is not subject to scuffing on the curb, cracking, crazing or discoloration and which may be easily and readily cleaned when washing the car.

Another object of the invention is to provide inexpensive means for producing contrasting side wall tire effect for automobile wheels and tires without coloring the tire per se and which may be easily and readily applied to any conventional automobile wheel and which may readily employ various colors to blend the contrasting tire side wall effect with body and fender colors.

Another object of the invention is to provide means for producing white or other contrasting tire side wall effect simultaneously with producing the effect of a large white or other contrasting side wall tire on a small wheel when employing a relatively larger wheel and standard tire comprising the employment of disc means extending from the hub cap of the wheel to over the rim thereof and suitably formed to represent a rim adjacent the hub cap and visually to represent the contrasting side wall of a tire radially outward from the said false rim representation.

Another object of the invention is to provide, in combination with an automobile wheel, tire and hub cap, a disc extending from over the rim of the wheel radially and axially inward to a point under the marginal edge of the hub cap and formed to represent a contrasting tire side wall terminating in a false rim representation adjacent the hub cap, the said disc being formed to be tensioned axially and secured on said wheel by said hub cap.

A further object of the invention is to provide a deep relief tire eye appearance with standard wheels and tires and ornamental wheel trim wherein the ornamental wheel trim and the standard wheel, tire and hub cap cooperate to provide a relatively smaller wheel and larger tire effect, and, by suitably coloring the wheel trim, an inexpensive scuff-proof white or colored tire side wall effect is accomplished while employing standard dark gray to black tires.

Other objects of the invention will become apparent by reference to the following detailed description taken in connection with the accompanying drawings, in which.

Figure 3:
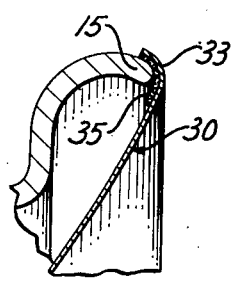

Fig. 3 indicates a gasket or resilient coating that may be used between the inner face of discs embodying the invention and the outer edge or lip of the rims of wheels covered thereby.

Figure 1:
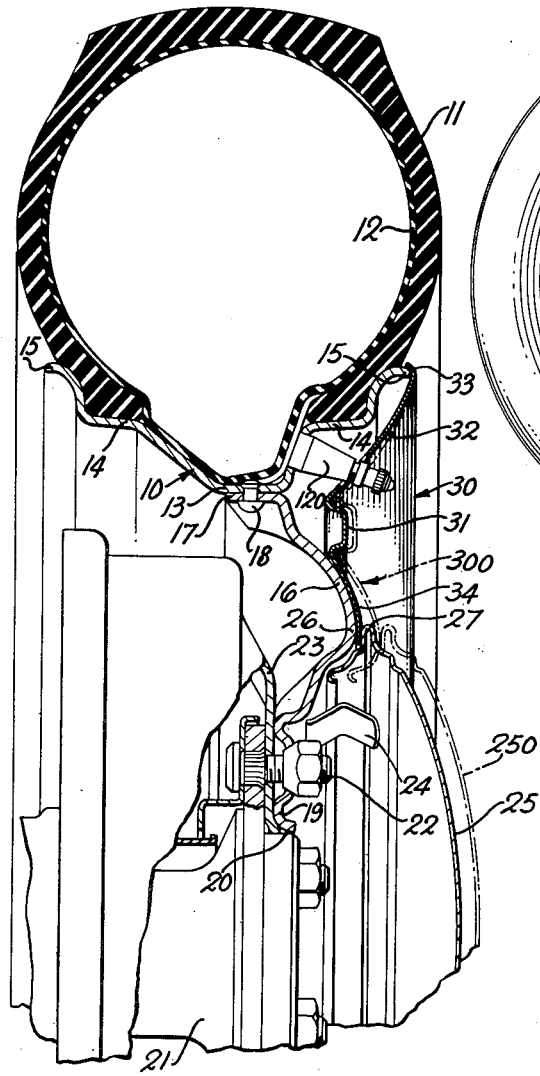
Fig. 1 is a fragmentary sectional view taken on the line 1—1 of Fig. 2 showing an automobile wheel and standard tire employing means embodying the invention to produce scuff-proof white side wall and balloon tire effects.

Fig. 4 is a fragmentary sectional view similar to Fig. 1 taken on the line 4—4 of Fig. 5 showing disc construction embodying the invention employing a chrome rim simulating ring to produce more ornate combined small wheel and large tire effects including scuff-proof white side wall tire effects.

Fig. 5 is a side elevational view of the wheel and tire disclosed in Fig. 4 showing the invention applied thereto.

Fig. 6 is a fragmentary detailed sectional view of the embodiment of the invention disclosed in Fig. 4 showing a preferred means for attaching the chrome rim simulating ring to the ornamental wheel trim disc.

Figure 2:
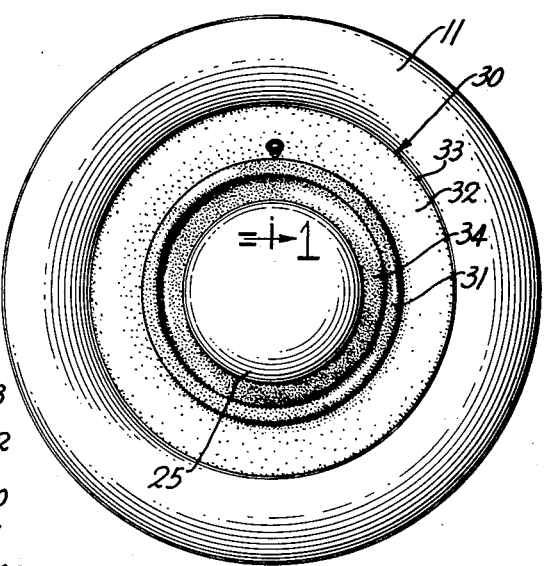
Fig. 2 is a side elevational view of the wheel and tire disclosed in Fig. 1 showing the invention applied thereto.

Referring now to the drawings wherein like numerals refer to like and corresponding parts throughout the several views, one illustrative embodiment of the invention is shown in Figs. 1 to 3 inclusive, and, while the invention may be employed in association with vehicle wheels and tires of various types, Fig. 1 shows the invention in connection with a wheel assembly composed of a drop center tire rim 10 having a standard preferably dark gray to black tire 11 and inflatable inner tube 12 thereon, the said tire rim 10 having a base flange 13, intermediate flanges 14, and extending side edges 15. The stem 120 of the inner tube 12 extends through an aperture in the drop center rim 10 as best shown in Fig. 1. The said wheel assembly also includes an annular body portion or hub 16 having an inwardly turned flange 17 at the outer periphery thereof to which the base flange 13 of the tire rim 10 is secured by such means as the rivets 18. The annular body portion or hub 16 is formed to provide a radially inward fastening flange 19 having an inner margin 20 defining a hub opening to accommodate the outer end of the vehicle axle 21.

The fastening flange 19 is preferably apertured at spaced intervals therearound to accommodate suitable bolts 22 by means of which the said wheel assembly is secured to a vehicle axle part such as the brake drum 23. The annular body portion or hub 16 of the said wheel assembly has a plurality of resilient hub cap retainer elements 24, generally five in number, spaced therearound which engage the hub cap 25 and normally hold it in position over the hub opening 20 and seated against the annular outwardly projecting bulge 26 of the said annular body portion or hub 16 of the wheel assembly.

In Figs. 1 to 3 inclusive, the ornamental wheel trim disc 30 illustrative of the invention is preferably formed of a resilient metal or other resilient material annular in shape and in such a size as to extend completely over the wheel assembly from under the outer periphery of the hub cap 25 to over the extending side edge or lip 15 of the rim 10. The said ornamental wheel trim disc 30 has formed therein adjacent or near the outer periphery of the hub cap 25 an annular rib 31 which represents, simulates or otherwise provides the visual effect of a rim of an automobile wheel and also provides the trim disk with stiffening means. The portion 32 of the said annular ornamental wheel trim disc 30 between the rim representing rib 31 thereof and the outer periphery 33 thereof is preferably formed to a suitable curvature to represent visually a radially and axially inward continuation of the side wall of the tire 11 mounted on the wheel assembly, and, the said outer periphery 33 of the annular ornamental wheel trim disc 30 is preferably curved over the side edge or lip 15 of the rim 10 in such a manner as to center the ring with the wheel and give a minimum shadow or bead effect at the juncture between the tire 11 and the ornamental wheel trim disc 30. The portion 34 of the annular ornamental wheel trim disc 30 represents a wheel between the rim representing rib 31 and the hub cap 25. As indicated in Fig. 1, the inner periphery of the annular ornamental wheel trim disc 30 extends under the outer peripheral lip 27 of the said hub cap 25.

The closer the rim representing rib 31 of the annular ornamental wheel trim disc 30 is to the hub cap 25, the larger the total tire effect of the wheel to which the said disc 30 is applied and the smaller the wheel appearance becomes. The said radially outer axially curved periphery 33 of the annular ornamental wheel trim disc 30 serves to guide the said annular ornamental wheel trim disc 30 central with respect to the wheel assembly just prior to snapping the hub cap 25 in clamped engagement on the hub 16 of the wheel assembly with the inner annulus of the wheel representing portion 34 of the said annular ornamental wheel trim disc 30 under the outer peripheral lip 27 of the said hub cap 25.

The annular ornamental wheel trim disc 30 is initially formed of thin resilient material with its inner annular wheel representing portion 34 axially shallower than will permit it to rest against the annular outwardly projecting bulge 26 of the hub 16 of the wheel assembly when the said annular ornamental wheel trim disc 30 is placed over the wheel rim 10 whereby to cause the said annular ornamental wheel trim disc 30 to be flexed axially inward with respect to and tensionally against the said bulge 26 of the hub 16 when the hub cap 25 is urged into engagement with the hub cap retainer elements 24. The annular ornamental wheel trim disc 30 and hub cap 25 are indicated in Fig. 1 by dot and dash lines 300 and 250 respectively in the position which they assume just prior to the urging of the hub cap 25 into final engagement with the hub cap retainer elements 24. For illustrative purposes, the degree of spring necessary to finally seat and center the ring in place is somewhat exaggerated in these drawings. The degree of tension desired is determined by the nature and thickness of the material from which the disc is formed. Thin sheet spring steel has been found very suitable but many other suitable materials may be used.

As indicated in Fig. 3, if desired, the seating face of the outer periphery 33 of the annular ornamental wheel trim disc 30 may be lined with a gasket or a coating material 35 such as a flexible lacquer, latex, or thin rubber. This will provide a friction element between the annular ornamental wheel trim disc 30 and the lateral extending edge 15 of the rim 10 whereby to prevent noise and overcome the tendency of the said disc 30 to rotate with respect to the rim 10 of the wheel assembly.

For example, to produce a scuff-proof white side wall tire effect, the tire side wall representing portion 32 of the ornamental wheel trim disc 30 is preferably colored white or near white, the rim representing rib 31 of the ornamental wheel trim disc 30 is preferably colored black or some other color sharply contrasting with the said side wall representing portion 32, and the wheel representing portion 34 of the ornamental wheel trim disc 30 is preferably colored any suitable color which would blend in well with the automobile having ornamental wheel trim discs 30 applied to its wheels. Obviously, many other color combinations may be employed, all in accordance with the color scheme of the vehicle having ornamental wheel trim discs 30 applied thereto.

It will be noted that the white side wall representing portion 32 of the ornamental wheel trim disc 30 is located axially inward from the outer side wall of the tire 11 whereby to cause the said outer side wall of the tire 11 to provide a cushioning or bumper axially outward from the ornamental wheel trim disc 30 to prevent scuffing or scratching thereof when a vehicle wheel equipped therewith is driven along and against a curb or the like.

Thus, the invention provides a white side wall tire simulation and effect by employing annular ornamental wheel trim disc 30 disposed under the conventional hub cap 25 and extending radially outward therefrom to and over the lip 15 of the rim 10 of the wheel of a motor vehicle of the like, the said disc means 30 being formed to provide an artificial rim or rim simulation 31 radially and axially inward from the lip 15 of the wheel rim 10, and that portion 32 of the annular ornamental wheel trim disc 30 radially outward from the said artificial rim or rim simulation 31 and radially inward from the outer periphery 33 thereof being formed to provide a radially and axially inward extension of the contour of the tire 11 mounted on the vehicle wheel.

By coloring this radially inward extension of the contour of the tire white, a highly desirable appearing white side wall tire effect is produced, and, at the same time, a large tire and small wheel effect is accomplished. The white wall simulating portion of the ornamental wheel trim disc is protected against scuffing by the side of the tire on the wheel upon which the ornamental wheel trim disc is mounted.

It is observed that the instant invention provides desirable scuff-proof doughnut or balloon white side wall tire effect without any of the undesirable features of white side wall or balloon tires.

If the portion 32 of the annular ornamental wheel trim disc 30 radially outward from the artificial rim or rim simulation 31 thereof and radially inward from the outer periphery 33 thereof which is formed to provide a radially and axialy inward extension of the contour of the tire 11 disposed on the vehicle wheel is colored dark gray to black to match the natural color of the said tires 11, then, a doughnut or balloon tire effect is produced with a standard wheel and standard tire; the tire appearing relatively larger and the wheel appearing relatively smaller.

Referring now to Figs. 4, 5 and 6, the construction shown therein is the same as the construction disclosed in Figs. 1 and 2 with the exception that a chrome or like finished rim ring 50 is placed over the rim representing rib 31 of the ornamental wheel trim disc 30 to further accentuate the rim representation 31 radially and axially inward from the lip 15 of the rim 10 of the wheel assembly onto which the ornamental wheel trim disc 30 is applied. The construction employing a chrome rim ring 50 is considered a deluxe embodiment of the invention and, when used, the white side wall tire and balloon tire effect of the construction disclosed in Figs. 1 and 2 is enhanced.

The chrome or like finished rim ring 50 may be secured to and over the rim representing rib 31 by such suitable means as a plurality of spring clips 51 and washers 52, the said spring clips 51 extending through suitable apertures provided in the rim representing rib 31.

Although but two embodiments of the invention have been disclosed and described in detail, it is obvious that many changes may be made in the size, shape, arrangement and detail of the elements of the invention without departing from the scope of the invention as defined by the appended claims, the construction disclosed and described being intended to be illustrative and not limiting.

I claim:

1. As a new article of manufacture, an automobile wheel accessory for simulating the appearance of a low pressure and/or white side wall tire, comprising, a circular member provided with an annular concentric stiffening means disposed inwardly of its outer margin, said outer margin being arranged to substantially overlie the lip of one of the tire-retaining flanges of said wheel to substantially conceal the same from view, the portion of said circular member lying between the outer margin thereof and said stiffening means being extended radially and axially inwardly and having a cross-sectional contour simulating a continuation of the curvature of the side wall of said tire, said member also having an annular portion extending generally radially inward of said stiffening means and flexible in use in a generally axial direction.

2. As a new article of manufacture, an automobile wheel accessory for simulating the appearance of a low pressure and/or white side wall tire, comprising, a circular member provided with an annular outwardly projecting concentric rib disposed inwardly of its outer margin, and an ornamental rim ring on said rib, said outer margin of said circular member being arranged to substantially overlie the lip of one of the tire-retaining flanges of said wheel to substantially conceal the same from view, the portion of said circular member lying between the outer margin thereof and said rib being extended radially and axially inwardly and having a cross-sectional contour simulating a continuation of the curvature of the side wall of said tire.

CHARLES B. ASKE, Jr.